(12) United States Patent
Dannecker et al.

(10) Patent No.: US 10,445,399 B2
(45) Date of Patent: Oct. 15, 2019

(54) FORECAST-MODEL-AWARE DATA STORAGE FOR TIME SERIES DATA

(71) Applicant: SAP SE, Walldorf (DE)

(72) Inventors: Lars Dannecker, Dresden (DE); Gordon Gaumnitz, Dresden (DE)

(73) Assignee: SAP SE, Walldorf (DE)

( * ) Notice: Subject to any disclaimer, the term of this patent is extended or adjusted under 35 U.S.C. 154(b) by 1140 days.

(21) Appl. No.: 14/284,936

(22) Filed: May 22, 2014

(65) Prior Publication Data

US 2015/0339416 A1    Nov. 26, 2015

(51) Int. Cl.
*G06F 17/10* (2006.01)
*G06F 17/18* (2006.01)
*G06Q 10/04* (2012.01)
*G06Q 50/06* (2012.01)

(52) U.S. Cl.
CPC .............. *G06F 17/10* (2013.01); *G06F 17/18* (2013.01); *G06Q 10/04* (2013.01); *G06Q 50/06* (2013.01)

(58) Field of Classification Search
CPC ........ G06Q 10/04; G05B 15/02; G05B 13/04; G05B 17/02
See application file for complete search history.

(56) References Cited

U.S. PATENT DOCUMENTS

| 2013/0024170 A1 | 1/2013 | Dannecker et al. |
| 2013/0194271 A1 | 8/2013 | Roesch et al. |
| 2014/0012881 A1 | 1/2014 | Roesch et al. |

OTHER PUBLICATIONS

Dannecker et al. "Partitioning and Multi-Core Parallelization of Multi-Equation Forecast Models", 2012, SSDBM 2012, LNCS 7338, pp. 106-123.*
Ding et al. "Improving Cache Performance in Dynamic Applications through Data and Computation Reorganization at Run Time", 1999, ACM p. 229-241.*
Rubin et al. "An Efficient Profile-Analysis Framework for Data-Layout Optimizations", 2002 ACM, 14 pages.*
The SciDB Development "Overview of SciDB", 2010 ACM, pp. 963-968.*
Agarwal et al., "Forecasting High-Dimensional Data", SIGMOD'10, Jun. 6-11, 2010, 9 pages.
Boehm et al., "Data Management in the MIRABEL Smart Grid System", EnDM, Mar. 30, 2012, pp. 95-102.
Borkar et al., "Platform 2015: Intel® Processor and Platform Evolution for the Next Decade", Intel, 2005, pp. 1-12.

(Continued)

*Primary Examiner* — Suzanne Lo
(74) *Attorney, Agent, or Firm* — Fish & Richardson P.C.

(57) ABSTRACT

A system includes multiple memory modules arranged and configured to store data and at least one processor that is operably coupled to the memory modules. The at least one processor is arranged and configured to select an access pattern of a forecast model, determine a storage layout model based on the identified access pattern of the forecast model, and store values in an order defined by the storage layout model using at least one of the memory modules. The order of the stored values enables sequential access to the stored values for use in the forecast model. Implementations of one or more features of the system may be performed by a computer-implemented method and/or a computer program product.

20 Claims, 10 Drawing Sheets

(56) References Cited

OTHER PUBLICATIONS

Byrd et al., "A Limited Memory Algorithm for Bound Constrained Optimization", Department of Electrical Engineering and Computer Science, May 1994, 25 pages.
Chilimbi et al., "Cache-Conscious Structure Definition", SIGPLAN '99, 1999, pp. 13-24.
Cohen et al., "MAD Skills: New Analysis Practices for Big Data", Mar. 20, 2009, 12 pages.
Cottet et al., "Bayesian Modeling and Forecasting of Intraday Electricity Load", Journal of the American Statistical Association, vol. 98, No. 464, Dec. 2003, pp. 839-849.
Dannecker et al., "Partitioning and Multi-Core Parallelization of Multi-Equation Forecast Models", SSDBM'12, 2012, pp. 1-18.
Dannecker et al., "pEDM: Online-Forecasting for Smart Energy Analytics", CIKM'13, Oct. 27-Nov. 1, 2013, 6 pages.
Das et al., "Ricardo: Integrating R and Hadoop", SIGMOD'10, Jun. 6-11, 2010, pp. 987-998.
Ding et al., "Improving Cache Performance in Dynamic Applications through Data and Computation Reorganization at Run Time", SIGPLAN '99, 1999, pp. 229-241.
Duan et al., "Processing Forecasting Queries", VLDB '07, Sep. 23-28, 2007, pp. 711-722.
Gardner Jr., Everette S., "Exponential Smoothing: The State of the Art", Journal of Forecasting, vol. 4, No. 1, 1985, 1-28 pages.
Gardner Jr., Everette S., "Exponential Smoothing: The State of the Art—Part II", Jun. 3, 2005, 81 pages.
Ge et al., "A Skip-List Approach for Efficiently Processing Forecasting Queries", PVLDB'08, Aug. 23-28, 2008, pp. 984-995.
Gong et al., "PARLO: PArallel Run-time Layout Optimization for Scientific Data Explorations with Heterogeneous Access Patterns", IEEE, 2013, pp. 343-351.
Gooijer et al., "25 years of time series forecasting", International Journal of Forecasting, vol. 22, 2006, pp. 443-473.
Große et al., "Bridging Two Worlds with RICE", Proceedings of the VLDB Endowment, vol. 4, No. 12, Aug. 29-Sep. 3, 2011, pp. 1307-1317.
Jamasb et al., "Electricity Market Reform in the European Union: Review of Progress Toward Liberalization & Integration", Center for Energy and Environmental Policy Research, 05-003 WP, Mar. 2005, 34 pages.
Microsoft, "Analysis Services Overview", Microsoft SQL Server 2008, Dec. 2007, 12 pages.
Microsoft, "Predictive Analysis with SQL Server 2008", Microsoft SQL Server 2008, Nov. 2007, 18 pages.
Nelder et al., "A Simplex Method for Function Minimization", The Computer Journal, vol. 7, No. 4, 1965, pp. 308-313.
Oracle, "Driving Strategic Planning with Predictive Modeling", Jul. 2008, pp. 1-9.
Ramanathan et al., "Short-Run Forecasts of Electricity Loads and Peaks", International Journal of Forecasting, vol. 13, 1997, pp. 161-174.
Rubin et al., "An Efficient Profile-Analysis Framework for Data-Layout Optimizations", POPL '02, Jan. 16-18, 2002, 14 pages.
Soroush et al., "ArrayStore: A Storage Manager for Complex Parallel Array Processing", SIGMOD'11, Jun. 12-16, 2011, pp. 253-264.
Taylor et al., "A Comparison of Univariate Methods for Forecasting Electricity Demand Up to a Day Ahead", EPSRC, May 2005, 36 Pages.
Taylor, James W., "Triple Seasonal Methods for Short-Term Electricity Demand Forecasting", European Journal of Operational Research, vol. 204, 2010, pp. 139-152.
The SciDB Development, "Overview of SciDB: Large Scale Array Storage, Processing and Analysis", SIGMOND'10, Jun. 6-11, 2010, pp. 963-968.
Winters, Peter R., "Forecasting Sales by Exponentially Weighted Moving Averages", Management Science, vol. 6, No. 3, Apr. 1960, pp. 324-342.
Wulf et al., "Hitting the Memory Wall: Implications of the Obvious", Dec. 1994, pp. 20-24.

* cited by examiner

FIG. 9A

| $y$ | $c'_0$ | $c'_1$ | $c'_2$ |
|---|---|---|---|
| $y_{21}$ R | $c_{0,20}$ R | $c_{1,10}$ R | $c_{2,0}$ R |
| ... | $c_{0,21}$ W | ... | ... |
| ... | ... | $c_{1,20}$ | $c_{2,10}$ |
| ... | ... | $c_{1,21}$ W | ... |
| ... | ... | ... | $c_{2,20}$ |
| ... | ... | ... | $c_{2,21}$ W |

| $y$ | $c_0$ | $c_1$ | $c_2$ |
|---|---|---|---|
| $y_0$ | $c_{0,0}$ | $c_{1,0}$ | $c_{2,0}$ |
| ... | ... | ... | ... |
| $y_{10}$ | $c_{0,10}$ | $c_{1,10}$ | $c_{2,10}$ |
| ... | ... | ... | ... |
| $y_{20}$ | $c_{0,20}$ R | $c_{1,20}$ | $c_{2,20}$ |
| $y_{21}$ R | $c_{0,21}$ W | $c_{1,21}$ W | $c_{2,21}$ W R |

| $y$ | $c'_0$ | $c'_1$ | $c'_2$ | $c_0$ | $c_1$ | $c_2$ |
|---|---|---|---|---|---|---|
| $y_{21}$ R | $c_{0,20}$ R | $c_{1,10}$ R | $c_{2,0}$ R | $c_{0,21}$ W | $c_{1,21}$ W | $c_{2,21}$ W |
| ... | $c_{0,21}$ W | $c_{1,20}$ | $c_{2,10}$ | ... | ... | ... |
| ... | ... | $c_{1,21}$ W | ... | ... | ... | ... |
| ... | ... | ... | $c_{2,20}$ | ... | ... | ... |
| ... | ... | ... | $c_{2,21}$ W | ... | ... | ... |

950

Legend for FIGS. 9A-9C $y$ - main time series
$c_i$ - seasonal components
$c'_i = c_i$ shifted down by $s_i$
$s_0 = 1, s_1 = 10, s_2 = 20$

| W | Write access |
|---|---|
| R | Read access |

- - - → synchronization

FORECAST-MODEL-AWARE DATA STORAGE FOR TIME SERIES DATA

TECHNICAL FIELD

This description relates to forecast-model-aware storage for time series data.

BACKGROUND

Forecasting is a data analysis technique used for decision making and automatic planning in many application domains including, for example, energy management, sales and traffic control. To predict future values forecasting uses mathematical models, commonly referred to as forecast models that describe a parameterized relationship between past and future values. The forecasting process using forecast models, including complex forecast models exhibiting a large number of parameters, may be a time consuming process. However, many application domains desire automatic decision support and planning in near real-time. Thus, while forecast models may provide a sufficient accuracy, they may lack in calculation performance, especially for complex domain-specific forecast models.

SUMMARY

According to one general aspect, a system includes multiple memory modules arranged and configured to store data and at least one processor that is operably coupled to the memory modules. The at least one processor is arranged and configured to select an access pattern of a forecast model, determine a storage layout model based on the identified access pattern of the forecast model, and store values in an order defined by the storage layout model using at least one of the memory modules. The order of the stored values enables sequential access to the stored values for use in the forecast model. In one implementation, the system is an in-memory database system.

Implementations may include one or more of the following features. For example, the at least one processor is arranged and configured to sequentially access the stored values for use in the forecast model. The forecast model uses time series data, the access pattern includes a main time series of data and the stored values are the main time series data for use in the forecast model. The access pattern of the forecast model includes a main time series of data and at least one additional time series of data and the storage layout model combines the main time series of data and the at least one additional time series of data. The access pattern of the forecast model includes a main time series of data and at least one additional time series of data, where the at least one additional time series of data includes time shifted main time series of data and the storage layout model combines the main time series of data and the at least one additional time series of data. The storage layout model defines a two-dimensional array of the stored values. The storage layout model defines multiple partitions, where each of the partitions includes a two-dimensional array of the stored values.

Implementations of one or more features of the system may be performed by a computer-implemented method and/or a computer program product.

The details of one or more implementations are set forth in the accompanying drawings and the description below. Other features will be apparent from the description and drawings, and from the claims.

BRIEF DESCRIPTION OF THE DRAWINGS

FIG. 9A is an example storage layout model illustrating a read-optimized layout.

FIG. 9B is an example storage layout model illustrating a write-optimized layout.

FIG. 9C is an example storage layout model illustrating a combined read-write optimized layout.

DETAILED DESCRIPTION

This document describes systems and techniques to store data used by a forecast model in a database or application based on the memory access patterns of the forecast model. In one example implementation, the database may be an in-memory database system. Different forecast models may exhibit different memory access patterns related to the values for a particular forecast model. The access pattern includes the order a forecast model reads values from a time series. In some implementations, the forecast model for each calculation time step in the model includes one or more values that are not consecutive in time. The access pattern of a forecast model may be identified and a storage layout model determined based on the identified access pattern of the forecast model. Values for the forecast model may be stored in an order defined by the storage layout model. The values may be stored in a database, such as an in-memory database, to enable sequential access (or substantially sequential access) to the stored values for use in the forecast model.

In one implementation, the stored values include time series data, where the time series data is used for forecasting by the forecast model. In this manner, the spatial locality of the data is increased to reduce the influence of memory latency on data access times. Improved calculation performance and other parameters including memory latency and access times may be observed when storing data in a manner to enable sequential access of the data by the forecast model.

Figure 1:
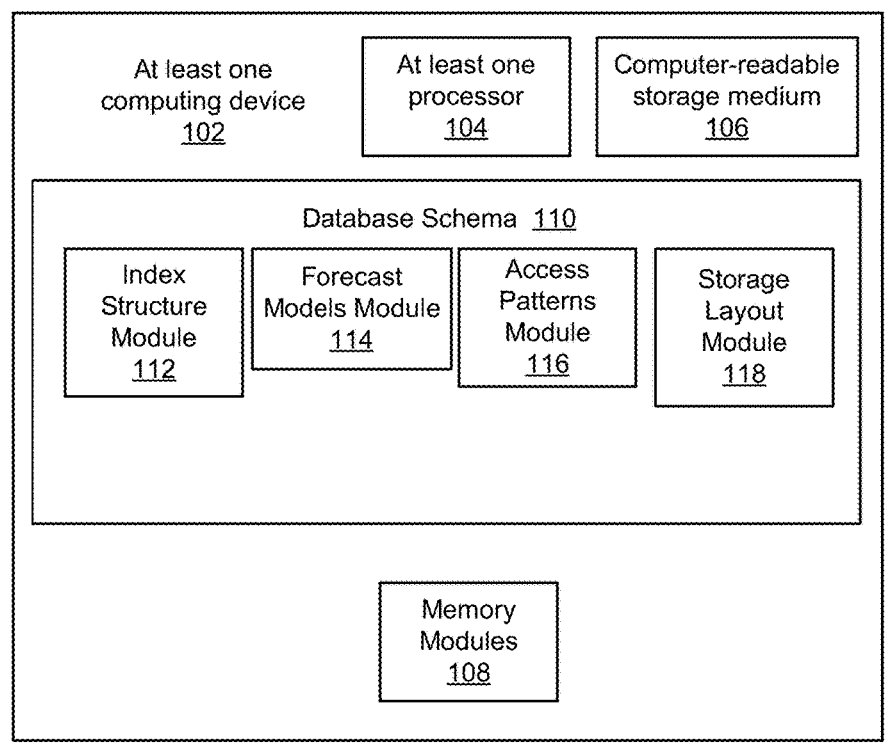
FIG. 1 is an example block diagram of a data storage system.

FIG. 1 is an example block diagram of a database system 100. The database system 100 is illustrated as being executed by at least one computing device 102, which is illustrated as including at least one processor 104 and a non-transitory computer readable storage medium 106. The computing device 102 may host the database system 100, where the computing device 102 may be a server, including a blade server, or other computing device capable of hosting such a database system 100. The computing device 102 may include multiple computing devices, such as, multiple servers, that are operably coupled and configured to host the database system 100 across the multiple computing devices. The computing device 102 may be networked to other computing devices (not shown) such that the systems on the computing device 102 may send and receive information across a network (not shown), such as the Internet, a wide area network and/or a local area network.

Thus, the at least one processor 104 may represent two or more processors executing in parallel, and the non-transitory computer-readable storage medium 106 may represent virtually any non-transitory medium that may be used to store instructions for executing database 104, and related data. Multiple processors also may be referred to as multi-core processors or multi-processor core environment. Further, the at least one computing device 102 may represent two or more computing devices, which may be in communication with one another.

One example implementation of the database system 100 may include an in-memory database platform. For instance, the in-memory database platform may be a massively parallel (distributed) data management system that runs fully in main memory, allow for row- and column-based storage options, and supporting built-in multi-tenancy. The features and functionality claimed and described herein may be implemented on such an example in-memory database system.

The database system 100 includes memory modules 108. The memory modules 108 may be a non-volatile memory or other type of memory that is configured to store large amounts of data. The memory modules 108 may include non-volatile memory such as, for example, flash memory. The memory modules 108 also may include volatile memory such as, for example, random access memory (RAM). The memory modules 108 may be configured to store data. Data may be written to and read from the memory modules 108 under the control and processing of the at least one processor 104.

The memory modules 108 may be divided into blocks of memory. A block of memory may be a sequential group of memory locations in a memory module. Additionally, multiple blocks may be arranged sequentially within the memory module. The size of a block of memory may vary based on the type of hardware used in the system. In one example implementation, the size of a block of memory may be a cache line with a size of 64 bytes. Data being read from the memory modules 108 may be read in a cache line having the size of 64 bytes. Other implementations and sizes of blocks of memory are possible. Similarly to data being read (or fetched) from the memory modules 108, data being written to the memory modules 108 also may be written in chunks, including block-sized chunks, as described above. Data also may be written to the memory modules 108 in other sizes.

The database system 100 includes a database schema module 110, which includes an index structure module 112, a forecast model module 114, an access pattern module 116 and a storage layout model 118. In general, the database schema module 110 may define the organization of the data in the database system 100. The database schema module 110 may define one or more tables or other data structures. In one example implementation, the database schema module 110 defines storage layout models for different types of forecast models based on the access pattern of the forecast model. The storage layout models are defined in a manner to enable the values to be stored in a sequential manner so the values may be sequentially accessed by the forecast models when needed for forecast computations.

The database schema module 110 may use the index structure module 112 to track the location of data in the memory modules 108. Each storage location in the memory modules 108 may be referenced by a memory address. For instance, the blocks of memory in the memory modules 108 may be referenced by a memory address, including a starting memory address for each block and may include pointers to other blocks of memory. The memory address refers to the physical location in the memory module where data is stored. The index structure module 112 may track the memory addresses and the data locations. Additionally, other tables and structures may be used in the database schema module 110 to map the address of the memory modules 108 to specific data written to the memory modules 108.

The forecast models module 112 may define forecast models that are used in forecasting in different application domains. Forecast models may include different types of forecast models including, for example, single-equation forecast models and multi-equation forecast models. Examples of the different types of forecast models are described below in additional detail. The values for use by the forecast models may be written to and read from the memory modules 108 as controlled by the processor 104 in cooperation with the database schema module 110.

The access patterns module 116 include different types of access patterns that are used by the different forecast models to access data for use in a particular forecast model. A storage layout model may be determined based on an access pattern and the storage layout model module 118 may store the different storage layout models. A storage layout model may define an order for storing the values needed by a forecast model based on the access pattern of the forecast model. In one implementation, the order for storing the values is in a sequential order to enable sequential access to the stored values for use in the forecast model.

In this manner, the processor 104 may identify an access pattern of a forecast model and determine a storage layout model based on the identified access pattern of the forecast model. The values (or data) for the forecast model may be stored in an order determined by the storage layout model. The order of the stored values enables sequential access to the values by the forecast model. In other words, the values may be stored in locations in the memory modules 108 that are in contiguous locations having contiguous memory addresses identifying those locations. When a block of data is read (or a cache line) by the processor 104, in most cases the forecast model uses all of the values fetched because they have been stored in the order needed by the forecast model.

Figure 2:
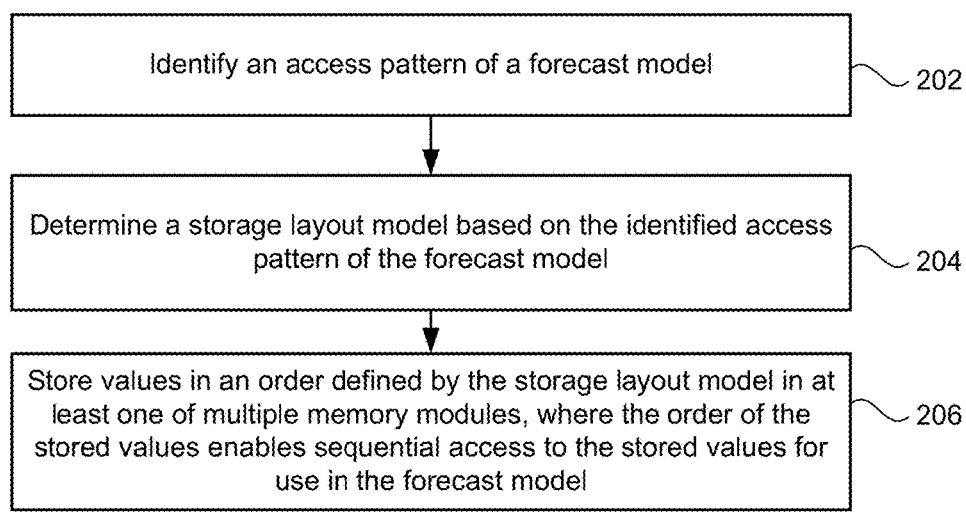
FIG. 2 is a flowchart illustrating example operations of the system of FIG. 1.

Referring to FIG. 2, an example flow chart illustrates a process 200 of example operations of the system 100 of FIG. 1. Process 200 include identifying an access pattern of a forecast model (202). For example, the processor 104 may identify an access pattern of forecast model, where the forecast model may be defined in the forecast models module 114 and a related access pattern for the forecast model may be defined in the access patterns module 116. In other example implementations, the access pattern for a forecast model may be identified by other means. In this manner, the access pattern may be identified using non-automated means.

Process 200 includes determining a storage layout model based on the identified access pattern of the forecast model (204). For example, the processor 104 may determine the storage layout model based on the identified access pattern of the forecast model. The storage layout model may be stored in the storage layout module 118.

Process 200 includes storing values in an order defined by the storage layout model in at least one of multiple memory modules, where the order of the stored values enables sequential access to the stored values for use in the forecast model (206). For example, the processor 104 may use the storage layout model and store the values in the order defined by the storage layout model in one of the memory modules 108. In this manner, when the processor 104 reads the values for use in the forecast model, the values as needed by the forecast model are accessed sequentially either by reading or writing consecutive (or sequential) locations in the memory modules 108. More details regarding forecast models, access patterns and storage layout models are described below. Access by the forecast model may refer either to reading values or to writing values in the manner described throughout this document.

In one example implementation, a forecast model may use time series data. Time series data in its most general form is a set of measurements exhibiting a strict sequential timely order. Time series data includes equidistant and non-equidistant time series, where equidistant time series exhibit a constant interval between its values (e.g., one value per 15 minutes) and non-equidistant time series contain measurements at arbitrary points in time. While forecast models use time series data, the forecast model may use a main time series of data and may refer to a number of additional time series of data. For example, a forecast model may use an additional time series of data that considers additional information such as seasonal behavior or measurements of external factors.

Forecast models may include different types of forecast models. For example, forecast models may be divided into multiple classes of models including single-equation forecast models and multi-equation forecast models. Single-equation forecast models describe the entire behavior of a time series using only a single equation containing multiple components for all relevant aspects of a time series. This typically involves the most recent time series values, trends, seasons as well as exogenous influences.

Figure 3:
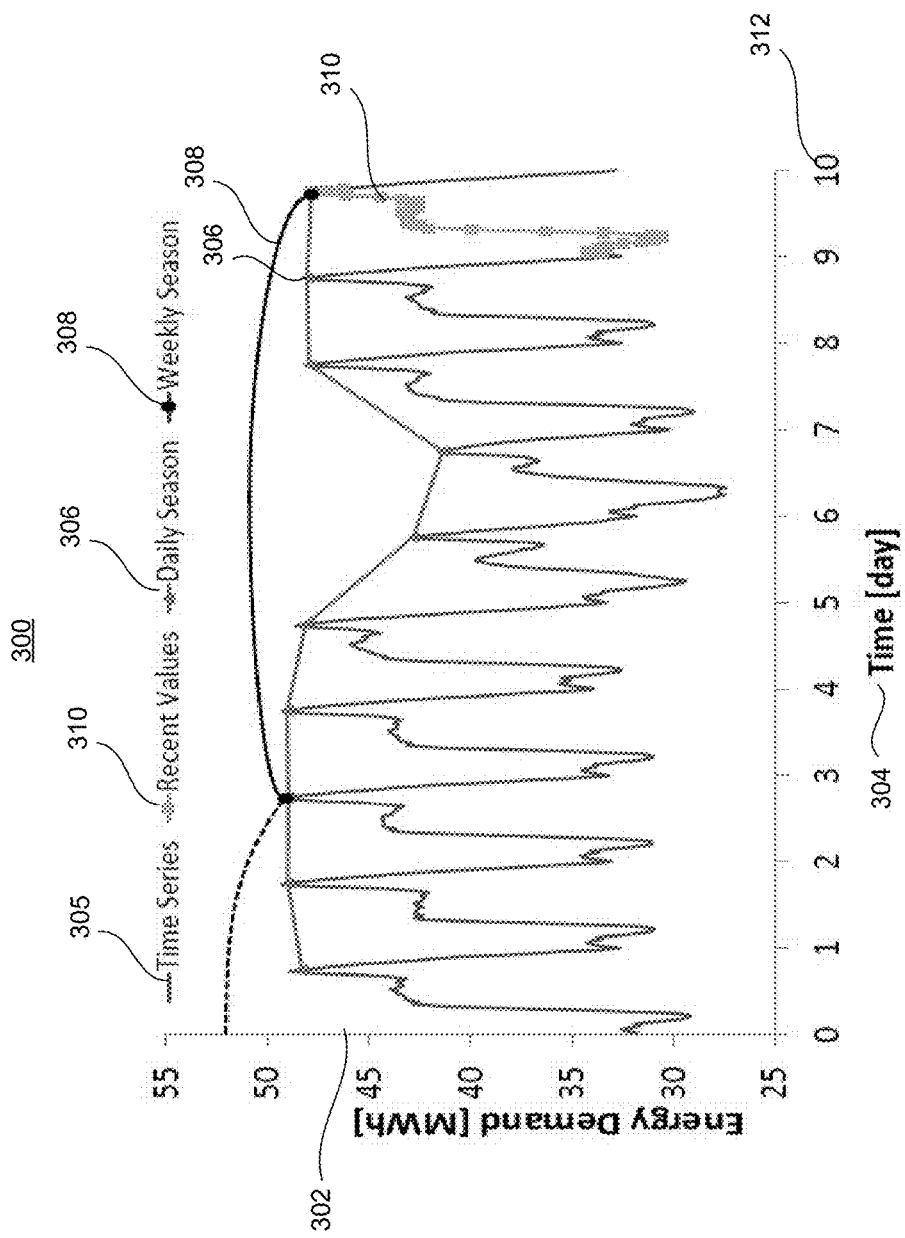
FIG. 3 is an example graph illustrating an example access pattern of a single-equation forecast model.

Common examples for single-equation models include exponential smoothing models (including numerous variations) as well as Box-Jenkins models (e.g., ARIMA). Referring to FIG. 3, an example graph 300 illustrates an example access pattern of a single equation forecast model. In this example, the y-axis 302 graphs the energy demand in mega-watt hours and the x-axis 304 graphs a point in time, which in this example is measured in days. The graph 300 illustrates an access pattern using time series values 305 that considers a daily 306 and weekly season 308 next to the actual current time series values 310. The graph 300 illustrates that at a particular point in time, the forecast model accesses not only the current time series values 310, but also earlier daily 306 and weekly season 308 values, where the earlier daily 306 and weekly season values 308 are not consecutive in series with the current time series values 310. Thus, the forecast model uses non-consecutive values to forecast a value for a next day, as can be seen with the values used to forecast energy demand for Day 10 (312). The below example shows the double seasonal exponential smoothing model as an example model that corresponds to the presented access pattern.

The double seasonal exponential smoothing model uses one equation to calculate a k step-ahead forecast. This equation includes the forecast origin $y_t$, the error correction smoothing parameter $\phi$, and three additional components, each representing a specific aspect of the underlying time series. The level component determines the current base value of the time series. Season 1 and season 2 are used to calculate the influence of the daily and weekly season, respectively. Each component exhibits its own parameter ($\lambda$, $\delta$, $\omega$) determining its concrete influence and stores its values calculated at the point in time t in a separate container. All values of the components are considered only $s_i$ steps later than when they were calculated, where $s_i$ represents the component-specific distance from the current point in time. In the example below, $s_0=1$, $s_1=$day and $s_2=$week.

$$\text{forecast } \hat{y}_t(k) = l_t + d_{t-s1+k} + w_{t-s2+k} + \phi^k(y_t - (l_{t-s0} + d_{t-s1} + w_{t-s2}))$$

$$\text{level } l_t = \lambda(y_t - d_{t-s1} - w_{t-s2}) + (1-\lambda)l_{t-s0}$$

$$\text{season 1 } d_t = \delta(y_t - l_{t-s0} - w_{t-s2}) + (1-\delta)d_{t-s1}$$

$$\text{season 2 } w_t = \omega(y_t - l_{t-s0} - d_{t-s1}) + (1-\omega)w_{t-s2} \quad \text{Equation (1)}$$

In contrast to single-equation models, multi-equation models decompose the time series into distinct time slots and assign a separate sub-model to each of them. Each sub-model is a separate instance of the given model equation exhibiting individual values for the included parameters. In some examples, the splitting of the time series is conducted along an observed season. Considering for example a time series with 24 values per day (hourly data) and a daily season, there would be 24 sub-models each corresponding to one hour during the day (e.g., model 8 corresponding to 08:00 am). In the energy domain for example, some representatives of this model class are the EGRV forecast model, first order stationary vector regression, and the PCA based forecast method.

The main reason for splitting up the time series and assigning separate sub-models is to ease the shape of a (sub-)time series each individual model has to describe. The underlying assumption is that time series values corresponding to a specific time slot fluctuate only very slightly over the selected season and thus, the relationship between past and future values is easier to model.

Figure 4:
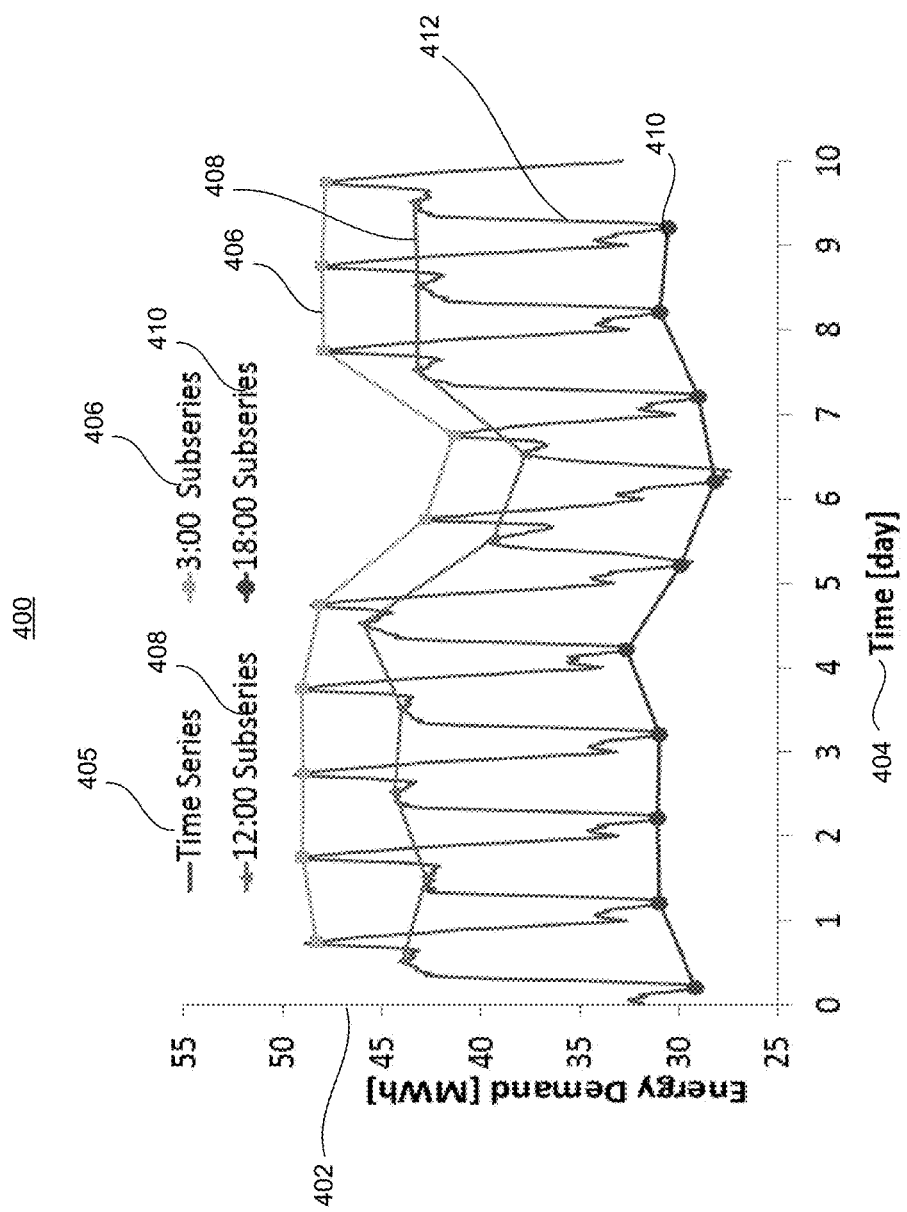
FIG. 4 is an example graph illustrating an example access pattern of a multi-equation forecast model.

Besides decomposing the time series with respect to a single season, it is also possible to provide separate sub-models to weekends and working days (weekly season) in addition to the hourly models decomposing the daily season. Referring to FIG. 4, an example graph 400 illustrates an access pattern for a multi-equation forecast model. In this example, the y-axis 402 graphs the energy demand in mega-watt hours and the x-axis 404 graphs a point in time, which in this example is measured in days. In the graph 400, the time series 405 is split along the daily season. The graph 400 illustrates three sub-models as time-series data for three different time periods namely, a 3:00 subseries 406, a 12:00 subseries 408 and an 18:00 subseries 410. For calculating forecasts, each sub-model 406, 408 and 410 considers historic values with respect to their assigned time frame and accordingly is producing forecasts for this time only. Thus, the sub-model assigned to the time 03:00 am 406 for example bases its calculations mainly on the time series values corresponding to 03:00 am. However, some models enrich their calculations with additional information that are potentially independent of the time series decomposition (e.g., error correction terms), but this does not change the general access patterns with respect to seasonal behavior.

The graph 400 illustrates that at a particular point in time, the forecast model accesses not only the current time series values, but also the values for the time subseries 406, 408 and 410, where these subseries values 406, 408 and 410 are not consecutive in series with the current time series values. Thus, the forecast model uses non-consecutive values to forecast a value for a next day, as can be seen with the values used to forecast energy demand for Day 9 (412). While the graph 400 illustrates hourly subseries time series values, other periodic subseries time series may be used (e.g., 1 minute, 15 minutes, 30 minutes, etc.).

The presented access patterns of single-equation forecast models and multi-equation forecast models represent two ways of accessing additional information such as trends or seasonal behavior. Single-equation models model the entire behavior of a time series including all additional information as part of their equation. In contrast, multi-equation models ease their modelling by decomposing the most relevant season. Accordingly, the observed access patterns may be referred to as "information modelling" and "season decomposition," respectively. It is also possible that both access patterns may occur in combination, meaning that for example a season not decomposed in a multi-equation model might be included in the sub-models using the information modelling pattern.

In other example implementations, forecast models may enrich the information provided by the main time series with additional information about external factors. Such models may use the correlation between the external factors and the main time series to draw more accurate conclusions about the future development of the main time series. When considering the energy domain for example, the energy production of wind parks is greatly influenced by the current wind speed, meaning that accurate forecasts without considering the wind speed may substantially suffer in accuracy. As a result, during the forecasting calculation the employed models access values from multiple time series rather than considering just one.

Figure 5:
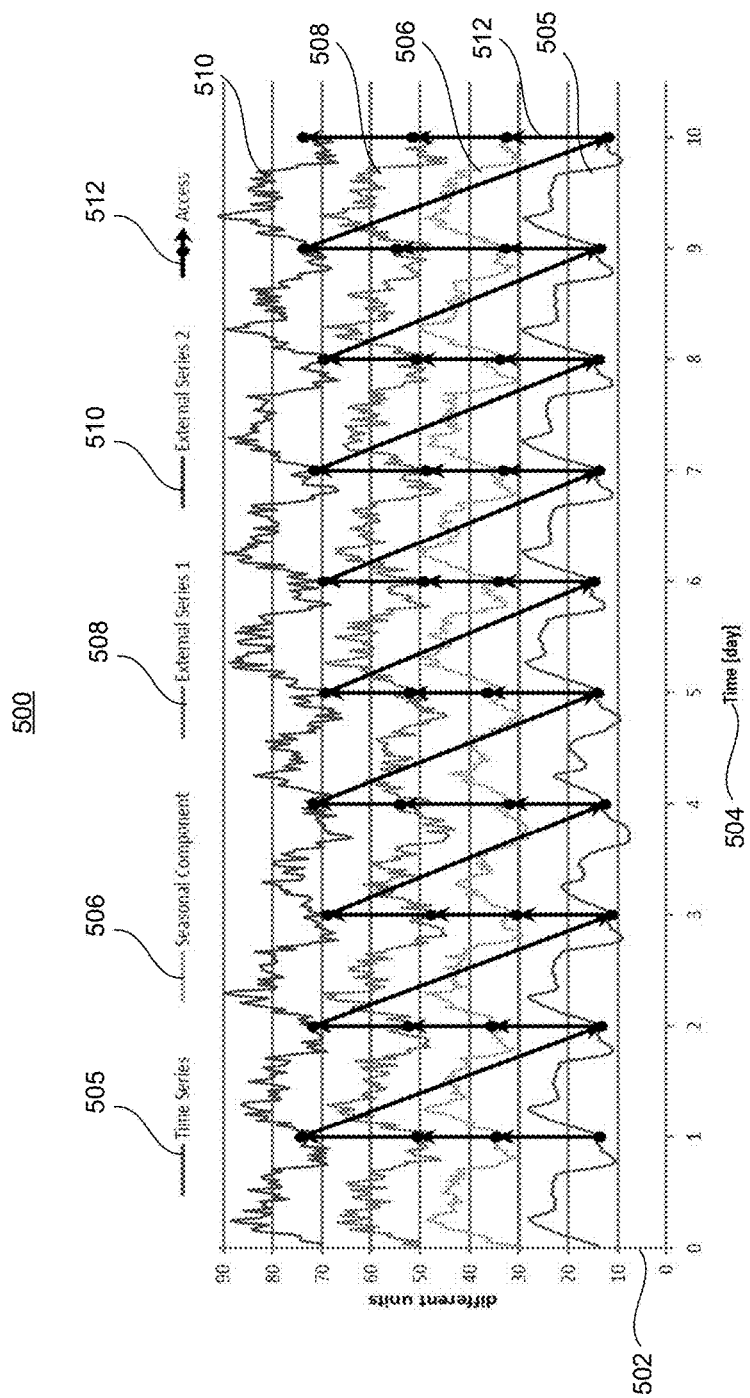
FIG. 5 is an example graph illustrating an example access pattern of a multiple time series forecast model.

Referring to FIG. 5, an example graph 500 illustrates an access pattern from a multiple time series forecast model. In this example, the y-axis 502 graphs a unit (e.g., wind energy production of windmills) and the x-axis 504 graphs a point in time, which in this example is measured in days. This type of access pattern illustrates an alternating access between all considered time series. The graph 500 includes the main time series 505, a seasonal component time series 506, a first external time series 508 and a second external time series 510. In one example implementation, where the graph 500 represents the energy production of windmills, the first external time series 508 may represent a current wind speed and the second external time series 510 may represent a different external factor affecting windmills. Thus, at a point in time t first the value of the main time series 505 corresponding to t is read and afterwards the values at t from the additional series 506, 508 and 510 are accessed successively, as illustrated by the access line 512 in the graph. This type of access pattern may be referred to as "series alternation." The series alternation access pattern occurs for both single-equation models and multi-equation models in the same manner, resulting in the fact that a combination of all three access patterns is possible.

In the following example equation, the combination of the different access patterns is illustrated using the multi-equation model EGRV. Assuming the production power P of a renewable energy power plant including wind and solar power is modelled under the influence of the wind speed W and he sun duration S. P, W, S and $\dot{P}$ are time series with start time t=0 and identical interval of length l (series alternation). The predicted value of the main time series is denoted as $\dot{P}$. The multi-equation EGRV model is divided into 24 sub-models $M_i$ in accordance to the hourly data and the daily season (season decomposition) of the main time series and additionally considers the weekly season denoted as $P_{t-168}^{ws}$) information modelling). The estimation on a training dataset starts from t=168, the sub-model $M_0$ first consumes the values $P_{168}$, $P_0^{ws}$, $W_{168}$ and $S_{168}$ and predicts the value $\dot{P}_{192}$. Afterwards, it considers $P_{192}$, $P_{24}^{ws}$, $W_{192}$ and $S_{192}$ to forecast $\dot{P}_{216}$. The described value access is repeated until the end of the time series is reached. After finishing the calculation for the sub-model $M_0$ the second sub-model $M_1$ starts at the subsequent index 169, following the exact same access pattern to approximate the value $\dot{P}_{169}$. The calculations are continued this way for all remaining sub-models $M_2$ to $M_{23}$.

$$M_0: P_{168}, P_0^{ws}, W_{168}, S_{168} \rightarrow \dot{P}_{192};$$ Equation (2)
$$P_{192}, P_{24}^{ws}, W_{192}, S_{192} \ldots$$
$$M_1: P_{169}, P_1^{ws}, W_{169}, S_{169} \rightarrow \dot{P}_{193};$$
$$P_{193}, P_{193}^{ws}, W_{193}, S_{193} \ldots$$
$$\vdots$$
$$M_{23}: P_{191}, P_{23}^{ws}, W_{191}, S_{191} \rightarrow \dot{P}_{215};$$
$$P_{215}, P_{47}^{ws}, W_{215}, S_{215} \ldots$$

Figure 6:
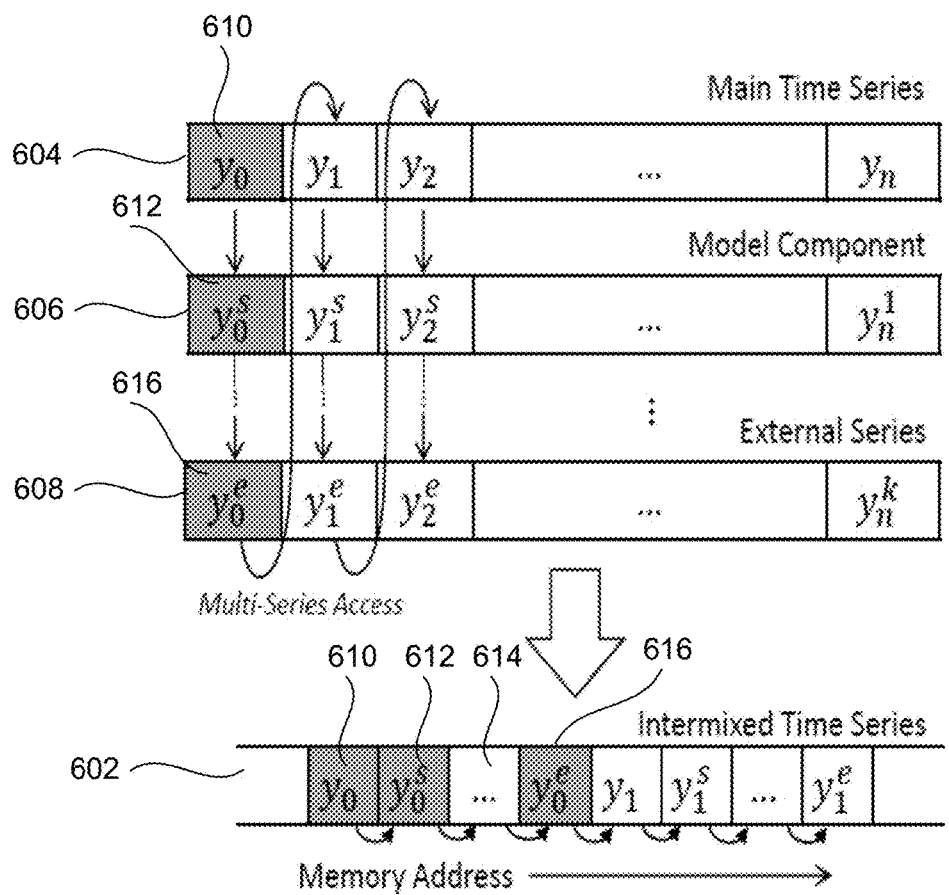
FIG. 6 is an example storage layout model illustrating an example storage layout model for both an information modelling access pattern and a series alternation access pattern.

Based on different identified access patterns, storage layout models may be defined for the different access patterns. Referring to FIG. 6, an example storage layout model 602 is illustrated for both an information modelling access pattern and series alternation access pattern. The storage layout model 602 includes values from multiple different time series components including, for instance, the main time series 604, the model component time series 606 and the external time series 608. The information modelling access pattern includes the most recent measurements as well as seasonal information and other additional factors.

Thus, at a point in time t a forecast model may for example consider the most recent time series value $y_t$ and additionally seasonal values with the distance of the respective season $y_{t-s}$; for example, the daily season $y_{t-d}$ and the weekly season $y_{t-w}$. This additional season information may be modelled as additional components describing the individual influence of a specific factor that is varying over time. Accordingly, each component may be maintained as an individual time series containing the influence values each for a specific point in time t. Thus, information modelling using additional components behaves very similar to the series alternation access pattern, because in both cases a forecast model is considering multiple time series at the same time. For this reason, the storage layout model 602 illustrated in FIG. 6 may be used for both access patterns.

The additional time series components and external factors 606 and 608 are conventionally stored in individual containers separate from the main time series 604, which means that they are most likely maintained in different areas of the main memory. However, FIG. 6 illustrates a storage layout 602 that enables sequential access to the main time series, the additional time series and the external factors. In this manner, the layout combines (or intermixes) all considered additional time series 604 and 606 with the main time series 604. The storage layout model 602 may be referred to as a multi-series storage layout.

Specifically, as illustrated in FIG. 6, the first value $y_0$ 610 from the main time series 604 is stored in the first memory address of the storage layout 602. The first value $y_0^s$ 612 of the model component 606 is stored in the next sequential memory address (or next consecutive memory address) of the storage layout 602. If there were another model component time series, then the first value from that model component time series would be stored in the next memory address 614 of the storage layout model 602. Then, the first value $y_0^e$ 616 of the external series 608 is stored in the next sequential memory address of the storage layout 602. Then, the pattern repeats by taking the second values from each of the time series and storing the second values in consecutive memory locations in the storage layout model 602, as illustrated by the flow arrows in FIG. 6.

As a result, instead of separate time series storage requiring an alternating access of memory locations between the series, all relevant values needed at a point in time t are stored sequentially in memory (or stored consecutively in memory) and thus, with a high spatial locality. Thus, the values can be accessed for the forecast model, which uses an access pattern to access values in a non-consecutive manner, in a sequential (or consecutive) manner leading to a reduced number of memory accesses and increased utilization of cache lines because the entire cache line that is fetched contains the needed values in a sequential order.

Furthermore, the number of unnecessary values stored in the different cache levels of the system significantly decreases, because all values needed for the current and following forecasting calculations are stored subsequently at consecutive memory addresses in main memory. Thus, each cache line contains a high number of values that are eventually considered by the forecast model. This substantially reduces the cache fragmentation and the number of cache misses in the different cache levels.

Figure 7:
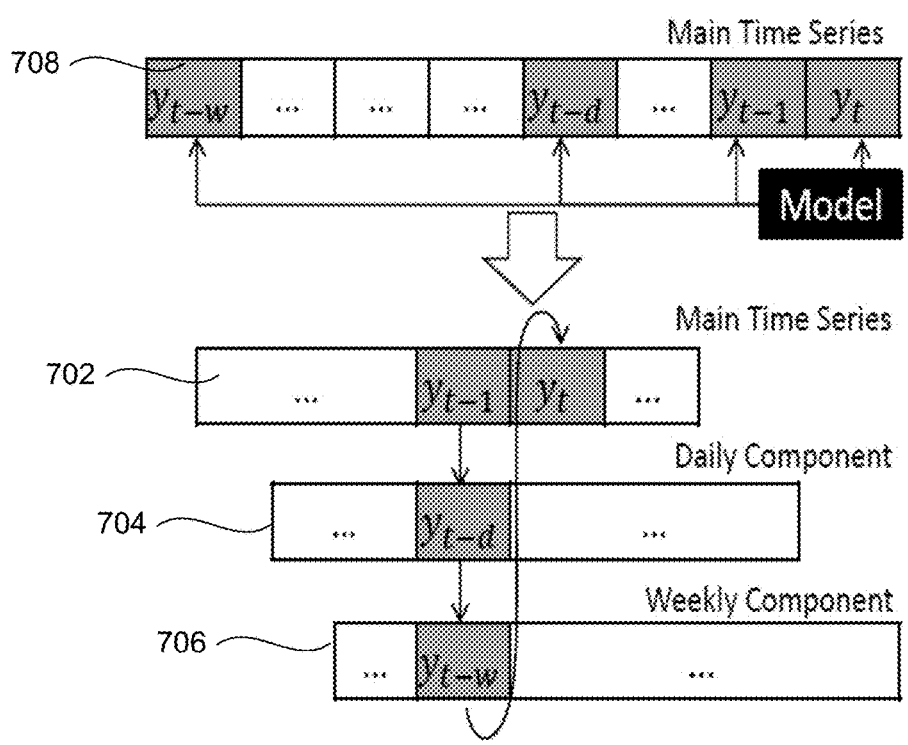
FIG. 7 is an example storage layout model illustrating an alternative example storage layout model for an information modelling access pattern.

For forecast models exhibiting the information modelling access pattern, but not using separate components for seasonal information, the above-described multi-series storage layout is also applicable. In most cases, such models directly use historic time series values in the distance of the respective seasons, as illustrated in FIG. 7. To provide all necessary values needed at point in time t at once, additional time series are created each containing shifted replicates of the main time series values corresponding to one season. These additional time series are then combined with the main time series as described for the multi-series storage.

Thus, in FIG. 7, the main time series 702 is time-shifted to create the other components, including the daily component 704 and the weekly component 706. The main time series 702 is combined with the other time series, namely the daily component 704 and the weekly component 706 to create the storage layout model 708.

Figure 8:
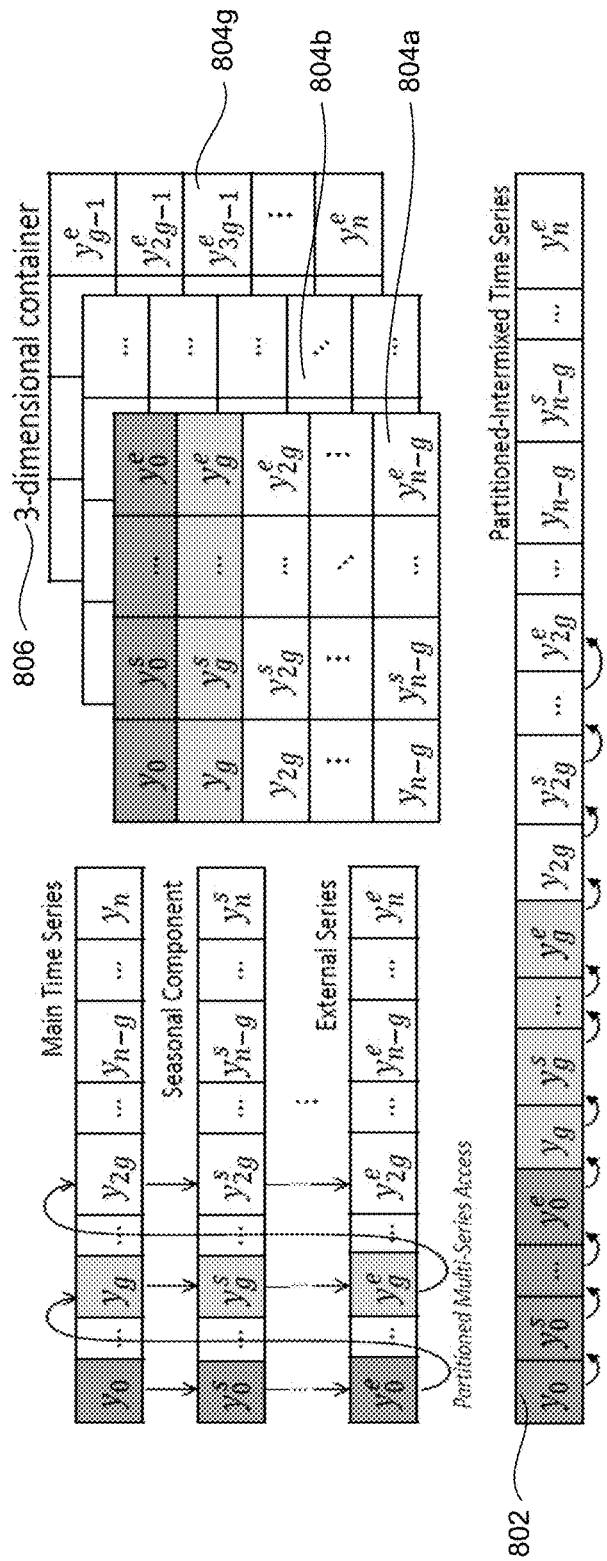
FIG. 8 is an example storage layout model illustrating a combination of a partition storage layout and a multi-series storage layout.

Referring to FIG. 8, an example storage layout model 802 combines a partitioning scheme with the multi-series storage layout illustrated in FIG. 6. A partitioning scheme for a season decomposition access pattern, for example, may use multiple partitions 804a-804g, where each partition contains values matching the time frame assigned to the respective sub-model. In main memory, the time series values of a partition are stored subsequently with a high spatial locality and can hence, be read fully sequentially.

FIG. 8 illustrates a combination of a partition storage layout and a multi-series storage layout as a partitioned-intermixed time series layout 802. First, the time series data is mixed as described above for the multi-series storage layout and then the resulting data pattern is partitioned with respect to the season decomposition pattern. The result can be seen as a three-dimensional data container 806. In particular, each sub-model is considered its own partition containing a two-dimensional array with respect to the multi-series storage.

Thus, the partitioning results in an additional third dimension compared to the pure multi-series storage. In the memory modules, this structure results in a continuous sequential data storage with a high spatial locality as shown in the partitioned-intermixed time series.

Example implementations of the above-described storage layout models are now discussed. First, an example implementation of the optimized time series to single-equation forecast models is described using exponential smoothing as an example. Exponential smoothing models are widely used for forecasting in many application domains such as financial markets, sales and energy.

One particular example is a multi-seasonal implementation. This model exhibits the information modelling access pattern and employs a separate component for each season and additional factors. The model is generalized to support an arbitrary (or configurable) number of seasonal information, which may be referred to as n-seasonal exponential smoothing (NES). The generalization of the model provides a storage layout scheme that is independent of the number of seasons in an exponential smoothing model.

The original equation of the double seasonal exponential smoothing (DES) model is provided above as Equation (1). To abstract the components of DES, the weights $\lambda$, $\delta$, $\omega$ are replaced with parameters $p_i$ and the component variables $l_t$, $d_t$, $w_t$ are replaced with $c_{i,t}$. The index I ($0 \le i \le N$) refers to the specific components and $s_i$ to the component specific distance. Additionally, the forecast origin is extracted as adjusted for all component values as $\sigma_t$. This allows the term to be reused once calculated when determining the values of the single components. This improvement is called $\sigma$ optimization and saves some arithmetic operations for models with a higher number of seasons N. The resulting equation is given as Equation (3):

$$\hat{y}_t(k) = c_{0,t} + \sum_{i=1}^{N} c_{i,t-s_i+k} + \phi^k(\sigma_t)$$

$$c_{i,t} = p_i(\sigma_t + c_{i,t-s_i}) + (1-p_i)c_{i,t-s_i}$$

$$\sigma_t = y_t - \sum_{i=0}^{N} c_{i,t-s_i}$$

Equation (3)

For each additional component $c_i$ the NES model stores an additional time series containing the influence values of the respective component. In contrast to the main time series, the values of these time series are not fixed, but are determined during forecasting calculation. As shown in Equation (3) and in Equation (1) when iterating over the time series the influence of all components $c_i$ is calculated for each specific point in time t. The calculation involves the current time series value adjusted for the influence of the other components (compare calculation of $\sigma$) and the former influence of the considered component $c_{i,t}-s_i$ with ($0 \le i \le N$). For the actual forecasting calculation, the influence values of most components are only considered $s_i$ times steps later than the point in time t they were calculated. The length of this distance $s_i$ depends on the time series aspect a specific component is representing. For example, with respect to the daily season $d_t$ the influence determined at point in time t is considered only 24 steps later at point in time $t+s_1$, where $s_1$=day assuming a time series in hourly granularity.

In one example implementation, to provide an optimal storage for the NES model, the multi-series storage layout, as illustrated in FIG. 6, is applied. Referring to FIG. 9A, a two-dimensional array 900 is created where each row 902-908 represents a point in time t and the columns contain the main time series $y_t$ as well as the influence values $c_i$ ($0 \leq i \leq N$) 912, 914 and 916. Accordingly, at each point in time t the NES model can read all relevant values sequentially. For instance, at point in time $y_0$ 902, the values from each of the columns 910, 912, 914 and 916 are read sequentially, as indicated by the "R" in each of the fields.

However, since new influence values are calculated during each calculation step, these new influence values are written to the two-dimensional array, as indicated by the values in the fields indicated by the "W". In the NES model, at least some of the calculated influence values are considered at later and component-specific points in time. In principal, the component time series $c_i$ are shifted by their distance $s_i$ with respect to the main time series $y_t$. As a result, while an optimal way is provided for reading values, each calculated value may be written into a different area of the main memory, meaning that the main memory may need to be accessed multiple times. FIG. 9A illustrates three components 912, 914 and 916 considered in addition to the main time series 910.

In one example implementation, a write-optimized storage layout may be created, where the different time series are aligned in such a way that the calculated values are written sequentially. Referring to FIG. 9B, a write-optimized storage layout 920 is illustrated. For instance, the written in fields 922, 924 and 926 are written in sequential order. However, due to the different distance factors of the components, the values for a single calculation may need to be read separately. That is, the reading of the values may not be sequential.

In one example, a read-optimized layout 900 may be advantageous over a write-optimized layout 920 for forecast models having a small number of components. The write-optimized layout 920 may be advantageous over the read-optimized layout 900 for forecast models having a larger or increasing number of components. Thus, for a forecast model where more values need to be written, it may be advantageous to use a write-optimized layout 920.

Referring to FIG. 9C, a storage layout model 950 illustrates a storage layout that combines the read and write-optimized layouts. Based on the read-optimized layout, replicates of the component columns 952, 954, and 956 may be added and aligned with the with respect to the component columns 958, 960 and 962. Then, it may be possible to sequentially read and later on sequentially write the required values. However, a combined layout may need to include synchronization of the values written to the replicates to the original time series, since the calculated values are considered later on. The synchronization is indicated in FIG. 9C by the dashed line and arrow head.

Figure 10:
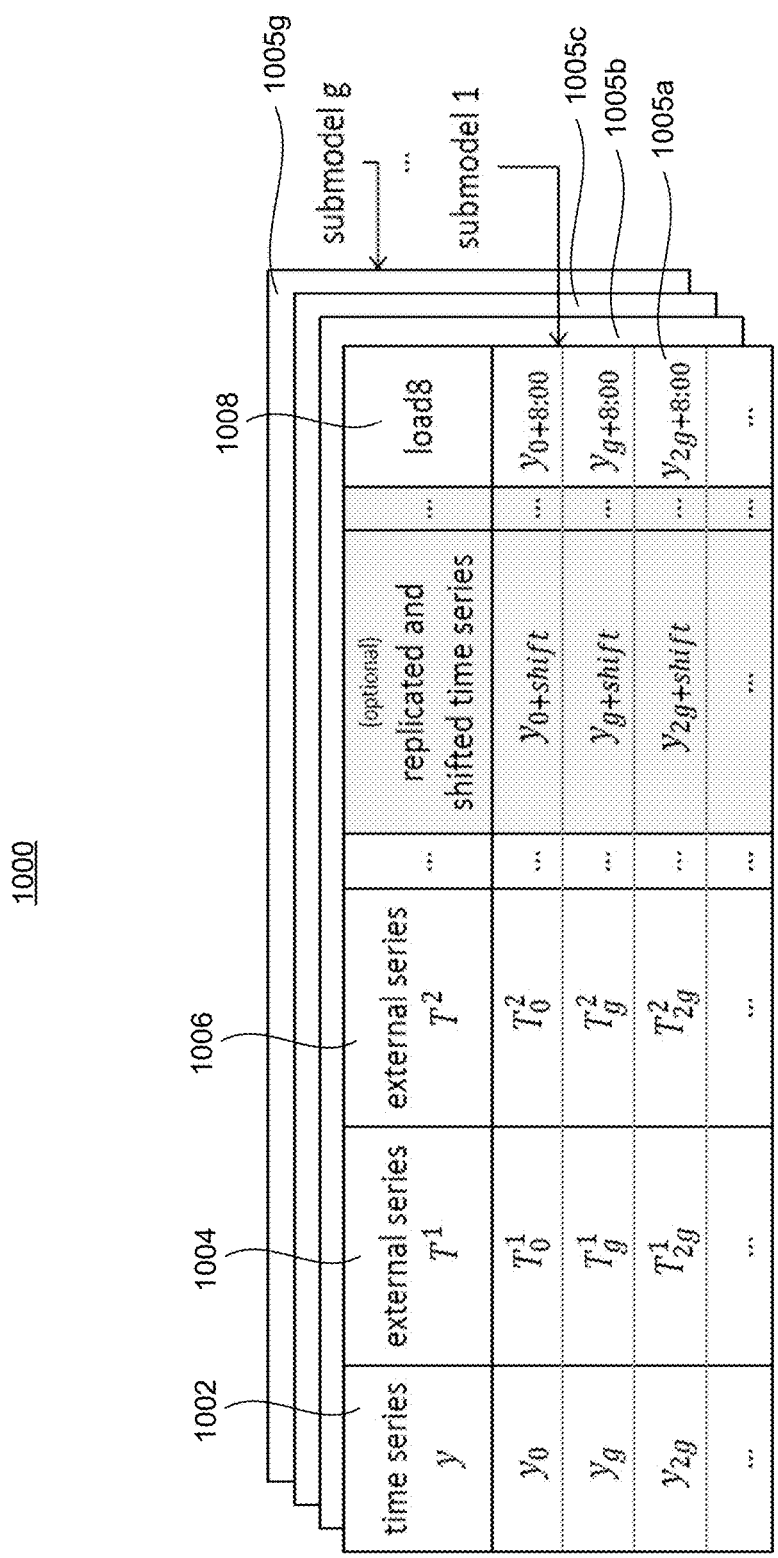
FIG. 10 is an example storage layout model for a multi-equation forecast model.

Referring to FIG. 10, an example storage layout model 1000 is illustrated for a multi-equation forecast model. One example of a multi-equation forecast model is the Engle, Granger, Ramanathan, and Vahid-Arraghi (EGRV) forecast model. The EGRV is a multi-equation forecast model used for forecasting energy demand and supply. To provide an optimal storage for the EGRV model, a combined storage layout that includes the advantages of the partitioned and the multi-series storage model layouts is used. The below Equation (4) illustrates one sub-model of an example EGRV model that considers the temperature, the wind speed and the sun duration as external information.

HOU R1=

$\alpha \cdot$deterministic$+\beta \cdot$Externals$+\gamma \cdot$load8$+\delta \cdot$Lags Externals=

$\beta_1 \cdot$temperature$+\beta_2 \cdot$wind speed$+\beta_3 \cdot$sun duration Lags=

$$\delta_1 y_{t-24} + \delta_2 y_{t-48} + \delta_3 y_{t-72} + \delta_4 y_{t-96} + \delta_5 y_{t-120} \qquad \text{Equation (4)}$$

Referring to FIG. 10, an example multi-equation storage layout model 1000 is illustrated using the EGRV model as an example. In principal, the sub-models of a multi-equation model refer to the external time series 1004 and 1006 in the same way they refer to the main time series 1002. This means the EGRV model has a series alternating pattern. Accordingly, the external time series may be partitioned in the same way the main time series is partitioned. In addition, for each sub-model 1005a-1005g the partitions of all involved time series may be combined pursuant to the combined storage layout as illustrated in FIG. 8 resulting in one two-dimensional array per partition containing all relevant information for each point in time t in one row. This includes the special component load8 1008, which denotes the previous time series value at 8:00 am and optionally also the Lags, which are accessed in an information modelling manner. Together with the two-dimensional array, other sub-model relevant data is stored such as date information, to have all data as close as possible in memory.

The combined storage layout applied to the EGRV forecast model allows for a sequential access to all required values, which also leads to higher utilization of the read cache lines. In particular, each fetched cache line only contains data that is relevant for a sub-model to predict a future value at a specific point in time t. In addition, since each sub-model only contains values from its partition, they are good candidates for a parallel computation of the sub-models when estimating the parameters of the entire EGRV model.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. An in-memory database system, the system comprising:
    a plurality of memory modules arranged and configured to store data, wherein the plurality of memory modules are non-transitory memory modules; and
    at least one processor that is operably coupled to the memory modules and that is arranged and configured to:
        identify a combination of two different access patterns of a forecast model, wherein the forecast model comprises time series data, and wherein the two different access patterns comprise two different types of access patterns including a season decomposition access pattern and a series alternation access pattern;
        determine a storage layout model based on the identified combination of two different access patterns of the forecast model, wherein the storage layout model combines the season decomposition access pattern and the series alternation access pattern of the two different access patterns; and
        store values in an order defined by the storage layout model using at least one of the memory modules, wherein the order of the stored values enables sequential access to the stored values for use in the forecast model.

2. The in-memory database system of claim 1 wherein the at least one processor is arranged and configured to sequentially access the stored values for use in the forecast model.

3. The in-memory database system of claim 1 wherein the combination of two different access patterns includes a main time series of data and the stored values are the main time series data for use in the forecast model.

4. The in-memory database system of claim 1 wherein the combination of two different access patterns includes a main time series of data and at least one additional time series of data and the storage layout model combines the main time series of data and the at least one additional time series of data.

5. The in-memory database system of claim 1 wherein the combination of two different access patterns includes a main time series of data and at least one additional time series of data, wherein the at least one additional time series of data includes time shifted main time series of data and the storage layout model combines the main time series of data and the at least one additional time series of data.

6. The in-memory database system of claim 1 wherein the storage layout model defines a two-dimensional array of the stored values.

7. The in-memory database system of claim 1 wherein the storage layout model defines multiple partitions, wherein each of the partitions includes a two-dimensional array of the stored values.

8. A computer-implemented method for adapting a storage layout model that is performed when instructions are executed that are stored on a non-transitory computer readable storage medium, the method comprising:
    identifying a combination of two different access patterns a forecast model, wherein the forecast model comprises time series data, and wherein the two different access patterns comprise two different types of access patterns including a season decomposition access pattern and a series alternation access pattern;
    determining a storage layout model based on the identified combination of two different access patterns of the forecast model, wherein the storage layout model combines the season decomposition access pattern and the series alternation access pattern of the two different access patterns; and
    storing values in an order defined by the storage layout model in at least one of a plurality of memory modules, wherein the order of the stored values enables sequential access to the stored values for use in the forecast model.

9. The method as in claim 8 wherein the memory modules are part of an in-memory database system.

10. The method as in claim 8 further comprising sequentially accessing the stored values for use in the forecast model.

11. The method as in claim 8 wherein the combination of two different access patterns includes a main time series of data and the stored values are the main time series data for use in the forecast model.

12. The method as in claim 8 wherein the combination of two different access patterns includes a main time series of data and at least one additional time series of data and the storage layout model combines the main time series of data and the at least one additional time series of data.

13. The method as in claim 8 wherein the combination of two different access patterns includes a main time series of data and at least one additional time series of data, wherein the at least one additional time series of data includes time shifted main time series of data and the storage layout model combines the main time series of data and the at least one additional time series of data.

14. The method as in claim 8 wherein the storage layout model defines a two-dimensional array of the stored values.

15. The method as in claim 8 wherein the storage layout model defines multiple partitions, wherein each of the partitions includes a two-dimensional array of the stored values.

16. A computer program product, the computer program product being tangibly embodied on a non-transitory computer-readable storage medium and comprising instructions that, when executed by at least one computing device to, are configured to cause the at least one computing device to:
  identify a combination of two different access patterns of a forecast model, wherein the forecast model comprises time series, and wherein the two different access patterns comprise two different types of access patterns including a season decomposition access pattern and a series alternation access pattern;
  determine a storage layout model based on the identified combination of two different access patterns of the forecast model, wherein the storage layout model combines the season decomposition access pattern and the series alternation access pattern of the two different access patterns; and
  store values in an order defined by the storage layout model in at least one of a plurality of memory modules, wherein the order of the stored values enables sequential access to the stored values for use in the forecast model.

17. The computer program product of claim 16 wherein the combination two different access patterns includes a main time series of data and at least one additional time series of data and the storage layout model combines the main time series of data and the at least one additional time series of data.

18. The computer program product of claim 16 wherein the storage layout model defines a two-dimensional array of the stored values.

19. The computer program product of claim 16 wherein the storage layout model defines multiple partitions, wherein each of the partitions includes a two-dimensional array of the stored values.

20. The in-memory database system of claim 1, wherein the two different types of access patterns further include an information modelling access pattern.

* * * * *